INVENTOR.
RICHARD T. BURNETT
BY Cecil D Arens
ATTORNEY

Patented Nov. 4, 1952

2,616,308

UNITED STATES PATENT OFFICE 2,616,308

TRANSMISSION

Richard T. Burnett, South Bend, Ind., assignor to Bendix Aviation Corporation, South Bend, Ind., a corporation of Delaware Application January 31, 1948, Serial No. 5,546

8 Claims. (Cl. 74—645)

This invention relates to energy transmitting mechanisms and more particularly to a retarding device for vehicles having transmissions of the type incorporating an infinitely variable hydro-kinetic torque converter.

An important object of the invention resides in the provision of a hydro-kinetic transmission for a vehicle driven by an internal combustion engine and interconnected therewith and with said vehicle so that the latter drives the engine at a speed above propeller shaft speed, at times, when it is desired to obtain a retarding force.

Figure 1:
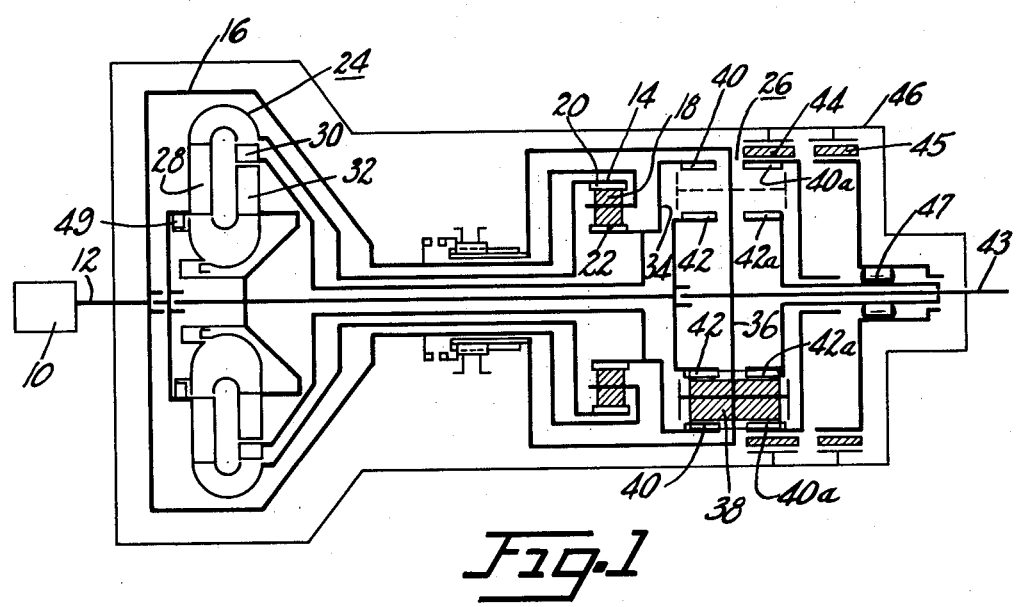
Figure 2:
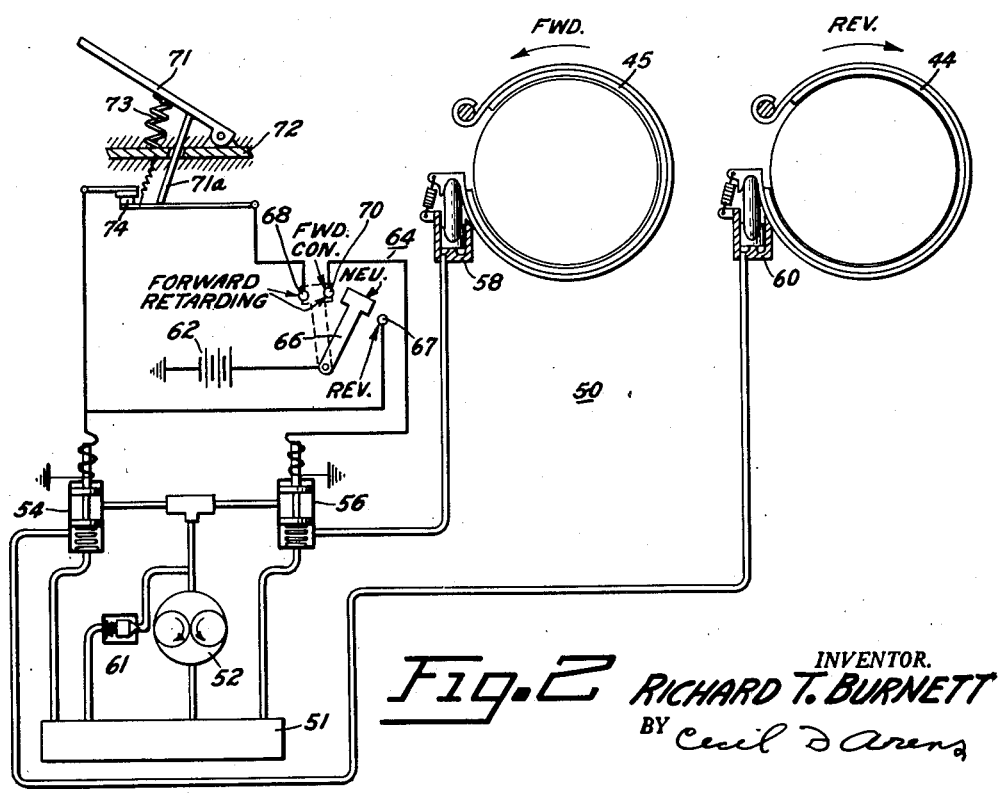

The above and other objects and features of the invention will be apparent from the following description of the apparatus taken in connection with the accompanying drawings which form a part of this specification in which:

Figure 1 is a schematic diagram of a transmission incorporating the invention; and Figure 2 is a diagrammatic representation of the control system of the invention.

Referring now to the schematic diagram of Figure 1 for a description of the transmission of the invention, energy from an internal combustion engine 10 is impressed upon an input shaft 12 which is drivably connected to a power splitting differential 14, through structure 16. The differential comprises a planet carrier 18 having planet gears mounted thereon for meshing with a ring gear 20, and a sun gear 22. The differential splits the power between an infinitely variable hydro-kinetic torque converter 24 and a torque multiplying planetary gear train 26. The torque converter includes a rotatable bladed impeller wheel 28, a rotatable bladed turbine wheel 30, and a bladed reaction wheel or member 32. Torque from the turbine wheel 30 of the hydrokinetic torque converter 24 is united in an element 34 with that portion of the torque transmitted from the differential to the planetary gear train. The planetary gear train 26 comprises a planet carrier 36 equipped with planet gears 38 disposed in meshing relationship with split ring gears 40 and 40a, and split sun gears 42 and 42a. To hold ring gear 40a and sun gear 42a against rotation friction brakes 44 and 45 are provided. During forward conventional drive, reaction from the transmission is taken in the sun gear 42a. During reverse drive, reaction from the transmission is taken in the ring gear 40a, at which time brake 45 is disengaged. An output shaft 43 is directly connected to the planet carrier 36 of the planetary gear train to receive the output torque thereof. Interposed between the planetary gear train 26 and housing 46, is a one-way clutch 47, and brake 45. The one-way clutch restricts rotation to one direction only of sun gears 42 and 42a, while the brake 45 takes the reaction in the transmission. This arrangement allows rotation of the guide wheel 32 in one direction only. However, under certain conditions, such as after torque multiplication in the transmission has ceased, or when the vehicle in which the transmission is mounted is permitted to drive the engine 10 during forward coasting, the guide wheel is rotated. A one-way clutch 49 is connected between the guide wheel structure 32 and the impeller wheel 28 so that when the guide wheel is rotated as in the latter case, rotation will be imparted to the impeller wheel but any tendency of the impeller wheel to impart rotation to the guide wheel is prevented.

The torque multiplying planetary gear train comprises sun gears 42 and 42a, the former of which is permanently connected to the reaction wheel 32, ring gears 40 and 40a, the former of which is integral with the element 34, and double planet pinions 38 mounted on a planet carrier 36, which is drivably connected to the output shaft 43. The sun gears 42 and 42a are provided with an equal number of teeth, and the ring gears 40 and 40a are likewise provided with an equal number of teeth. The planet pinions 38, only one of which is shown, are of uniform pitch diameters throughout their entire length. Although gears 42 and 42a are shown as two independent gears their function in the gear train is the same as if the two gears were rigidly tied together. That is, since the double planet pinions 38 are of the same pitch diameters along their entire lengths, a one-to-one ratio is established between the gears 42 and 42a. With such a relationship, of one-to-one ratio, between the pairs of sun and ring gears, it is evident that when one of the gears of a pair is fixed the other gear of that pair must also be fixed.

The transmission per se, herein disclosed in schematic form, is shown in detail and claimed in my application Serial No. 793,233, filed December 22, 1947.

In order to change from a condition in the transmission wherein power input from an engine is impressed on engine shaft 12 and power output taken from propeller shaft 43, to thereby drive a vehicle, to a condition wherein the power developed from vehicle momentum is impressed on propeller shaft 43 and power output taken in engine shaft 12, to thereby drive the latter shaft at a speed in excess of the former shaft, means 50, Figure 2, is provided for use in conjunction with the above described transmission. This means, which is used for selectively connecting the transmission, as aforementioned is in the form of a control mechanism which includes a hydraulic system, having a reservoir 51, pump 52, solenoid valves 54 and 56, single acting fluid motors 58 and 60, and conduits interconnecting the pump to the motors, via the solenoid valves. A relief valve 61 is interposed between the pump outlet and the reservoir to by-pass fluid thereto when the pressure at said pump outlet reaches a predetermined value. The solenoid valves are of a type which normally cut off flow of fluid therethrough, but when the valves are energized the fluid from the pump 52 is directed to the motors 58 or 60 depending upon which solenoid is energized. An electrical circuit having a battery 62 as a source, supplies energy to the selected solenoid valve at the proper time through manipulation of a selector switch 64. The switch is provided with a lever 66 swingable from a normally neutral position, shown in Figure 2, to forward drive, forward retarding drive, and reverse drive positions. In this specification forward conventional drive is that drive in which the vehicle is maintained when it is desired to impel the vehicle forward by power received from its engine. Forward retarding drive is that drive in which a vehicle is maintained when it is desired to drive the engine of a vehicle by the power developed through vehicle momentum, whereby the vehicle speed is retarded.

With the selector switch in neutral position power cannot be transmitted through the transmission because the motors 58 and 60 are ineffective to lock brakes 44 and 45 through which reaction must be transmitted to housing 46. In forward conventional drive, the lever 66 rests on contact 70 to complete the circuit between the solenoid valve 56 and the battery 62. This energizes solenoid valve 56 causing it to open to admit fluid under pressure to the motor 58 of the forward brake 45. As best shown in Figure 1 energizing forward brake 45 locks sun gear 42a to the housing through the one-way clutch 47. Hence during forward conventional drive, that is, with the selector switch on contact 70 brake 45 is actuated to thereby take reaction from the transmission during torque multiplication. In forward retarding gear position, the lever 66 rests on contacts 68 and 70 to thereby energize both solenoid valves to admit fluid under pressure to motors 58 and 60. An accelerator 71, supported by vehicle structure 72, is normally urged to released position by a spring 73 interposed between the vehicle structure and the accelerator. The accelerator is provided with a finger 71a, so that when the selector switch of the vehicle is in forward retarding drive position, with the accelerator depressed, the finger 71a engages a normally closed switch 74 in series with the reverse solenoid valve 54 so that the switch 74 is opened and the solenoid is de-energized when the accelerator is depressed, whereby the brake 44 is released. It will be noted that at this time the forward drive brake 45 is locked and solenoid 56 is energized through contact 70. With the accelerator depressed while the selector switch is in forward retarding drive position, the vehicle and transmission respond in the same manner as when the transmission is connected for forward drive, as above described. That is, the solenoid 54 which controls fluid to motor 60 of the reverse brake is de-energized since switch 74 is open, whereby the reverse drive brake 44 is rendered inoperative.

When the selector switch is in forward retarding drive position with the accelerator released, as shown in Figure 2, with lever 66 being shown in dotted lines, brakes 44 and 45 are locked. At this time solenoid valves 54 and 56 are energized, whereby fluid under pressure is admitted to motors 58 and 60. Under these conditions the vehicle drives the engine shaft 12 at a speed greater than that of the propeller shaft 43, whereby the retarding action of a vehicle is increased. This increase in speed of shaft 12, to which engine 10 is connected is due to the arrangement of the power splitting differential 14 and planetary gear train 26, with respect to the hydro-kinetic torque converter 24. As already pointed out brakes 44 and 45 are locked, hence ring gears 40 and 40a, are held against rotation in both directions and sun gears 42 and 42a are held against rotation in one direction only, since the latter gears are connected to the housing 46 through the one-way clutch 47. The planet carrier is now rotated by shaft 43, driving the sun gears 42 and 42a in the same direction at an increased speed. The ring gears 40 and 40a are held fixed by brake 44, with reaction being taken through ring gear 40a into housing 46. Since the impeller 28 is connected to the guide wheel through the one-way clutch 49, rotation of sun gear 42 not only drives the guide wheel but also imparts rotation to the impeller wheel which in turn is connected to the engine shaft through the ring gear 20 of the differential 14. With the sun gear 22 of the differential fixed by reason of its direct connection to element 34 of the ring gear 40, the differential acts as a reduction gear to thereby drive the shaft 12 at a speed lower than the impeller speed but greater than the speed of shaft 43, which as hereinbefore pointed out, receives the power input.

As long as the engine is driving the vehicle, and not the vehicle driving the engine, the accelerator will be depressed, and clutch 47 will hold the sun gears against rotation during torque multiplication in the transmission, regardless of whether the selector switch is in forward conventional or forward retarding gear position. Of course, at this time, that is, with the accelerator depressed, the brake 44 is inoperative because when the selector valve switch is in the former position, namely, forward drive, the solenoid valve 54 which controls the fluid to the reverse brake is cut out of the circuit, and when the selector switch is in the latter position, namely, forward retarding position, the solenoid valve 54, although in the circuit which is normally energized by lever 66, is now de-energized by the opening of the switch 74. Thus it is possible to have forward drive whenever the throttle is depressed even though the switch is in forward retarding drive position.

With the selector switch in reverse position, at which time lever 66 rests on contact 67, solenoid valve 54 is energized to admit fluid under pressure to brake 44. Brake 45 is now free since solenoid valve 56 is not energized. The vehicle is now connected for reverse operation. Attention is called to the fact that brake 44 performs a dual purpose. During forward retarding drive, when the input power is impressed on shaft 43, brake 44 locks ring gear 40a to thereby take reaction in housing 46. Also during reverse drive brake 44 locks ring gear 40a to thereby take reaction in the housing. With this arrangement it is possible to change the transmission from forward drive into either forward retarding or reverse drive when it is desired to retard the vehicle speed.

Although only one embodiment of the invention has been illustrated and described, various changes in the form and relative arrangements of the parts may be made to suit requirements.

I claim:

1. A transmission for a vehicle comprising input and output shafts, torque multiplying means interposed between said shafts and including a hydro-kinetic torque converter provided with rotatable bladed impeller, turbine, and guide wheels, means for holding the guide wheel against rotation in one direction and allowing rotation in the other direction, a one-way clutch interposed between the impeller and guide wheels so that the impeller wheel cannot drive the guide wheel during rotation in one direction of the impeller wheel but permitting the latter wheel to be driven by the guide wheel when it is rotated, said torque multiplying means including a planetary gear set provided with a planet carrier mounting pinions, ring and sun gears intermeshing with said pinions, said planetary carrier connected to the output shaft, said ring gear connected to said turbine wheel, said sun gear connected to said guide wheel, means for holding the ring gear against rotation, control means for said first and second-named holding means operative to establish a power transmitting connection through the one-way clutch, with the output shaft driving the input shaft.

2. In a transmission equipped with forward, and forward retarding drive, the combination of a hydrokinetic torque converter having guide and turbine wheels, a planetary gear train provided with a ring gear interconnected with said turbine wheel and a sun gear interconnected with said guide wheel, means for holding said sun gear to prevent rotation thereof in one direction when the transmission is connected in forward drive, means for holding said ring gear against rotation when the transmission is connected in forward retarding drive, and means connected with both of said holding means for selecting one of the aforesaid drives, said last named means including an accelerator operated device for changing the drive from forward drive to forward retarding drive or vice versa.

3. In an automotive transmission equipped with input and output shafts and having a reverse drive, and a forward retarding drive, the combination of a hydrokinetic torque converter comprising guide, impeller, and turbine wheels, said impeller wheel interconnected with the input shaft, a gear train provided with a planet carrier mounting pinions, a ring gear meshing with said pinions and interconnected with said turbine wheel, a sun gear meshing with said pinions and interconnected with said guide wheel, said planet carrier being interconnected with said output shaft, means for holding said ring and sun gears against rotation, and means connected with said holding means for selectively establishing the transmission in reverse or forward retarding drive, said last named means including a device responsive to accelerator position for taking the transmission out of forward retarding drive.

4. In an automotive transmission equipped with input and output shafts and having a forward drive, reverse drive, and forward retarding drive, the combination of a hydrokinetic torque converter comprising guide, impeller, and turbine wheels, said impeller wheel interconnected with the input shaft, a gear train provided with a planet carrier mounting pinions, a ring gear meshing with said pinions and interconnected with said turbine wheel, a sun gear meshing with said pinions and interconnected with said guide wheel, said planet carrier interconnected with said output shaft, a brake for said turbine wheel interconnected therewith through said ring gear, a brake for holding said guide wheel interconnected therewith through said sun gear, a one-way clutch interposed between said second named brake and said sun gear, and control means connected to said brakes for selectively establishing the transmission in one of the aforesaid drives, said last named means including a mechanism responsive to accelerator position so that when the transmission is connected in forward retarding drive with the accelerator released both brakes are applied and the turbine wheel is held against rotation, with said guide wheel being connected to said output shaft.

5. In an apparatus of the class described in claim 4 comprising means for releasing the first mentioned brake when the accelerator is depressed.

6. A transmission for a vehicle equipped with an accelerator and comprising input and output shafts, a hydro-kinetic torque converter having rotatable bladed impeller, turbine and reaction wheels, means for holding the reaction wheel against rotation in one direction and allowing rotation in the other direction, means for connecting the reaction wheel to the impeller wheel to drive the latter when the former is being rotated, a planetary gear arrangement interconnected with the input and output shafts and said impeller, turbine, and reaction wheels, means interconnected with the planetary gear and said turbine wheel for holding the latter against rotation, and control means for said first and last named means including a mechanism normally rendering said last named means ineffective and said first named means effective when the accelerator is depressed and vice versa when the accelerator is released.

7. A transmission for an engine driven vehicle comprising a housing, input and output shafts, a hydro-kinetic torque converter provided with reaction, turbine, and impeller wheels, a torque multiplying device including a planetary gear train having a ring gear permanently connected to said turbine wheel, a sun gear permanently connected to said reaction wheel, a planet carrier permanently connected to said output shaft and mounting pinions arranged in meshing relationship with said sun and ring gears, a one-way clutch interposed between said impeller and guide wheels, said impeller wheel permanently connected to said input shaft, a first brake releasably connecting the ring gear to the housing, a second brake releasably connecting the sun gear to the housing, a one-way clutch interposed between the sun gear and housing for holding the guide wheel from rotation in one direction, and manually settable means operatively connected to said brakes to energize the same, said last named means including a mechanism responsive to accelerator position for de-energizing one of said brakes.

8. A transmission for an engine driven vehicle comprising a housing, input and output shafts, a hydro-kinetic torque converter provided with reaction, turbine, and impeller wheels, a torque multiplying device including a planetary gear train having a ring gear permanently connected to said turbine wheel, a sun gear permanently connected to said reaction wheel, a planet carrier permanently connected to said output shaft and mounting pinions arranged in meshing relationship with said sun and ring gears, a power splitting differential having an element connected to said input shaft, a second element connected to said impeller wheel, a third element connected to said turbine wheel and to said ring gear, a one-way clutch interposed between said impeller and guide wheels, said impeller wheel permanently connected to said input shaft via said power splitting differential, a first brake releasably connecting the ring gear to the housing, a second brake releasably connecting the sun gear to the housing, a one-way clutch interposed between the sun gear and housing for holding the guide wheel from rotation in one direction, and manually settable means operatively connected to said brakes to energize the same, said last named means including a mechanism responsive to accelerator position for de-energizing one of said brakes.

RICHARD T. BURNETT.

REFERENCES CITED

The following references are of record in the file of this patent:

UNITED STATES PATENTS

| Number | Name | Date |
|---|---|---|
| 2,168,862 | Lavaud | Aug. 8, 1939 |
| 2,190,831 | Dodge | Feb. 20, 1940 |
| 2,298,649 | Russell | Oct. 13, 1942 |
| 2,316,390 | Biermann | Apr. 13, 1943 |
| 2,343,955 | Cotterman | Mar. 14, 1944 |
| 2,456,328 | Schneider | Dec. 14, 1948 |